(12) United States Patent
Nelson et al.

(10) Patent No.: US 6,321,332 B1
(45) Date of Patent: *Nov. 20, 2001

(54) FLEXIBLE CONTROL OF ACCESS TO BASIC INPUT/OUTPUT SYSTEM MEMORY

(75) Inventors: Albert R. Nelson; Peter A. Ward, both of Olympia, WA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,562

(22) Filed: Jun. 17, 1998

(51) Int. Cl.[7] .................................................. G06F 15/177
(52) U.S. Cl. .............................................. 713/2; 711/202
(58) Field of Search ........................................... 713/1, 2

(56) References Cited

U.S. PATENT DOCUMENTS

| | | | |
|---|---|---|---|
| 5,193,161 | * | 3/1993 | Bealkowski et al. ................ 395/400 |
| 5,473,775 | * | 12/1995 | Sakai et al. ........................... 395/700 |
| 5,781,492 | * | 7/1998 | Gittinger et al. ............... 365/230.01 |
| 5,860,001 | * | 1/1999 | Cromer et al. ............................ 713/1 |
| 5,889,987 | * | 3/1999 | Nelson et al. ............................ 713/2 |
| 5,912,849 | * | 6/1999 | Yasu et al. ............................ 365/195 |
| 5,949,997 | * | 9/1999 | Smith ..................................... 713/2 |
| 5,960,445 | * | 9/1999 | Tamori et al. ....................... 707/203 |
| 5,961,643 | * | 10/1999 | Klein ..................................... 713/2 |
| 5,987,581 | * | 11/1999 | Nale .................................... 711/202 |
| 5,987,605 | * | 11/1999 | Hill et al. ................................ 713/2 |
| 6,006,172 | * | 12/1999 | Synder et al. ....................... 702/186 |

* cited by examiner

Primary Examiner—Thomas Black
Assistant Examiner—Mary Wang
(74) Attorney, Agent, or Firm—Kenyon & Kenyon

(57) ABSTRACT

Flexible control of access to a Basic Input/Output System memory is provided by a programmable non-volatile storage unit that stores a non-volatile signal and generates a control signal based on the non-volatile signal. A control circuit coupled to the programmable non-volatile storage unit receives the control signal from the non-volatile storage unit. The control circuit also receives a BIOS memory address signal and generates a modified BIOS memory address signal. In this way, different BIOS programs may be accessed on boot-up.

10 Claims, 4 Drawing Sheets

*PRIOR ART*

FLEXIBLE CONTROL OF ACCESS TO BASIC INPUT/OUTPUT SYSTEM MEMORY

FIELD OF THE INVENTION

The present invention relates to computers. More particularly, the present invention relates to the flexible control of access to a computer's Basic Input/Output System memory.

BACKGROUND OF THE INVENTION

Many computers execute a Basic Input/Output System (BIOS) program when turned on, or "booted-up." The BIOS program may, for example, establish how information is transferred between the computer's Operating System (OS) and attached devices such as a hard disk drive or a video card. In this way, the OS does not need to be configured based on the specific details, such as hardware addresses, of the attached devices. When device details change, only the BIOS program needs to be changed.

The BIOS program is typically stored in a BIOS memory, such as a flash memory integrated circuit. When the computer boots-up, a processor passes control to the BIOS program, which is located at a known location, or "address," in the BIOS memory.

A first manufacturer may design a circuit board with, among other things, one or more processors and a BIOS memory. The first manufacturer typically places a BIOS program at a pre-determined boot-up address in the BIOS memory. The processor is configured to always access that pre-determined address during boot-up, resulting in the first manufacturer's BIOS program being executed. A second manufacturer, however, may want to use the circuit board in a different way, and may have different requirements for the BIOS program.

In this case, the first BIOS program could be re-written in a way that supports the requirements of both manufacturers, but such a program may be difficult to write. In addition, the first manufacturer may not be able to complete the design and testing of the circuit board until the BIOS is re-written. Therefore, it may be desirable to write a second, separate, BIOS program that executes, in place of the first BIOS program, when the computer boots-up.

This could be done, for example, by storing the second BIOS program at the pre-determined boot-up address. This solution, however, requires that the first manufacturer have two different circuit boards, one with the first BIOS program and the other with the second BIOS program. Moreover, a circuit board built for one manufacturer could not be used by the other manufacturer unless the BIOS memory was physically replaced.

Another way of supporting different BIOS requirements is to have, for example, two BIOS programs stored in a single BIOS memory. FIG. 1 illustrates how two BIOS programs may be stored in a BIOS memory 100, as is known in the art. The first BIOS program comprises a first boot block 110 followed by one or more code blocks 112, or other types of information blocks such as parameter blocks. The second BIOS program comprises a second BIOS boot block 120 followed by one or more code blocks 122. As shown in FIG. 1, the first program starts at memory address "0000 0000" and the second program starts at memory address "1000 0000." Although an eight-bit memory address is used as an illustration, the memory address can, and usually does, contain more than eight bits.

When the processor boots-up, it may, for example, always try to access BIOS memory address "0000 0000." In this case the first BIOS program will execute. If, however, the circuit board can be manually configured such that the first bit of the memory address is always set to "1," the second BIOS program would execute instead. As is known in the art, the value of the first bit of the memory address may be manually set using a "jumper" wire that can be manually moved or installed by a manufacturer. In this way, the manufacturer can select which of the two BIOS programs will be executed. A single circuit board can therefore be used by either manufacturer, depending on the state of the jumper wire.

However, this requires that a manufacturer manually move or install the jumper wire on the circuit board, and this process can be labor intensive and expensive. Moreover, this method of selecting a BIOS program can lead to errors. For example, the manufacturer may forget to move a jumper, causing the circuit board to boot-up with the wrong BIOS program.

SUMMARY OF THE INVENTION

In accordance with an embodiment of the present invention, a programmable non-volatile storage unit generates a control signal. A control circuit coupled to the non-volatile storage unit receives the control signal. The control circuit also receives a BIOS memory address signal and generates a modified BIOS memory address signal.

DETAILED DESCRIPTION

Figure 1:
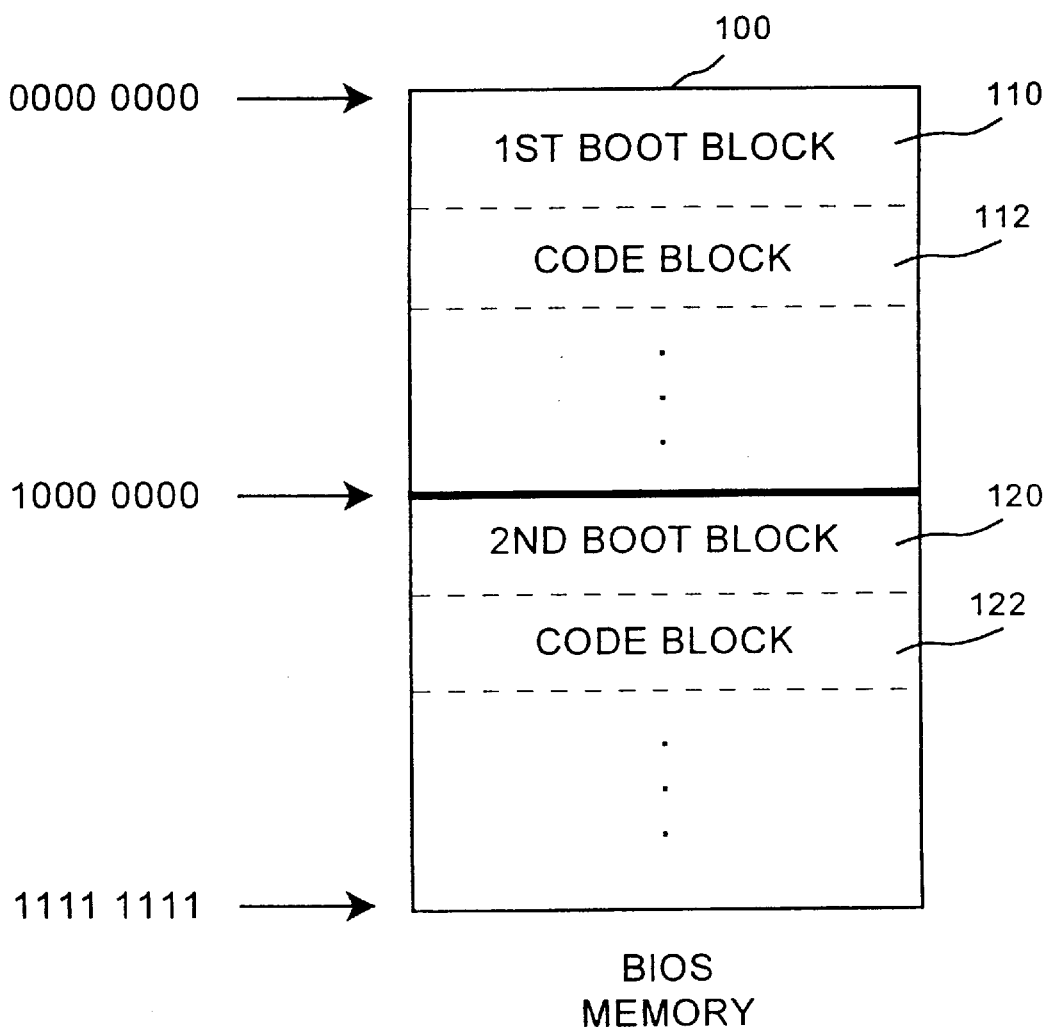
FIG. 1 illustrates how two BIOS programs may be stored in a BIOS memory, as is known in the art.
Figure 2:
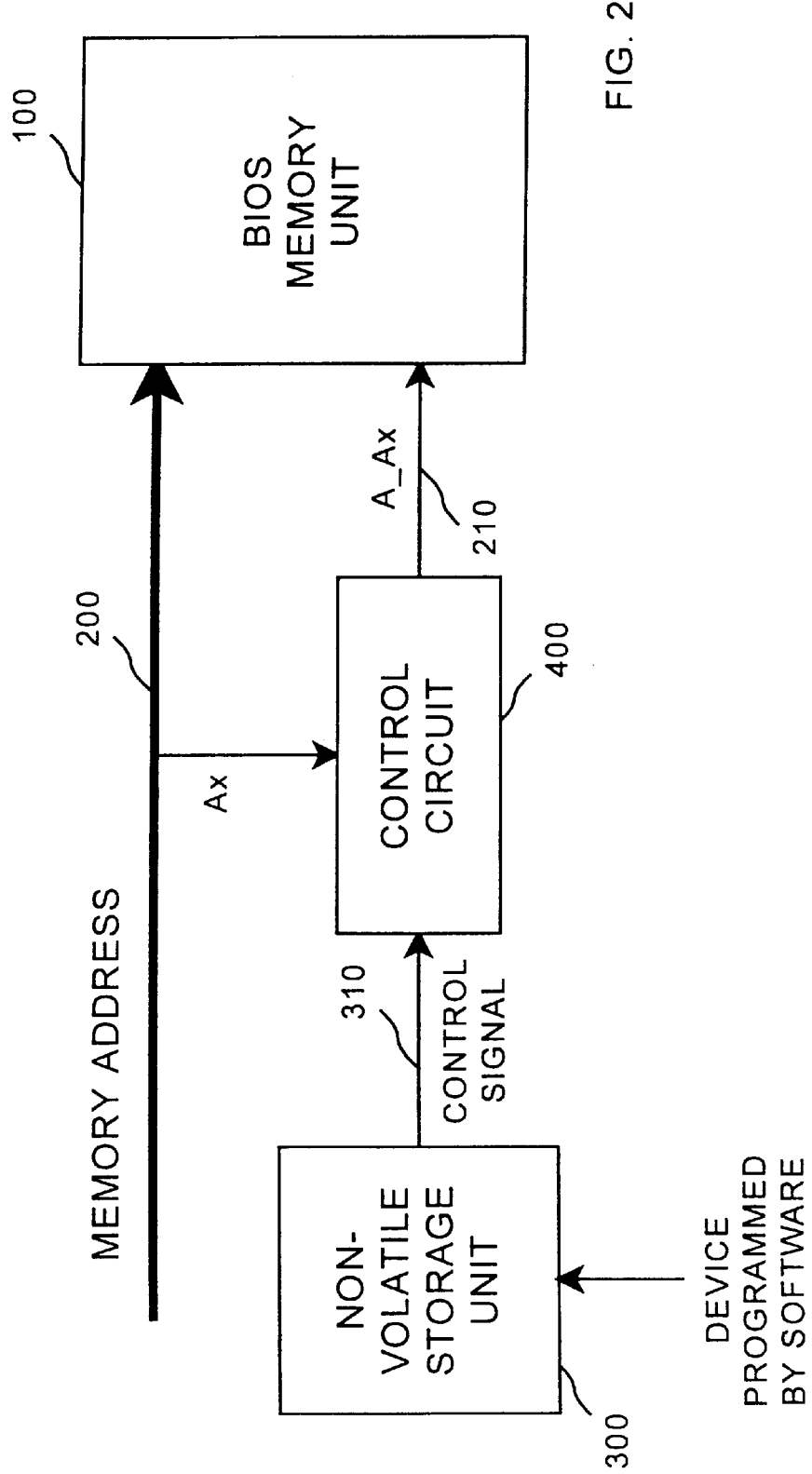
FIG. 2 is a block diagram of a circuit that controls access to a BIOS memory unit according to an embodiment of the present invention.

An embodiment of the present invention is directed to the flexible control of access to a computer's Basic Input/Output System memory. Referring now in detail to the drawings wherein like parts are designated by like reference numerals throughout, FIG. 2 is a block diagram of a circuit that controls access to a BIOS memory unit 100 according to an embodiment of the present invention. The BIOS memory unit 100 may store, for example, a first BIOS program starting at a first address, such as "0000 0000," and a second BIOS program starting at a second address, such as "1000 0000." Although an eight-bit memory address is used as an illustration, the memory address may contain more than eight bits. For example, according to an embodiment of the present invention, a four megabyte BIOS memory may be accessed using an 18-bit memory address. Similarly, although two BIOS programs are used as an illustration, it will be understood that a different number of BIOS programs can be used instead.

According to an embodiment of the present invention, a programmable non-volatile storage unit 300 stores a non-volatile signal that can be programmed, for example, using a software program. As used herein, the term "non-volatile" means the ability to maintain the state of a signal between boot-ups. As will be described, the non-volatile signal controls which BIOS program in the BIOS memory unit 100 will be executed on boot-up. Based on the non-volatile signal, the non-volatile storage unit 300 generates a control signal 310 that is sent to a control circuit 400.

Upon boot-up, a processor (not shown in FIG. 2) accesses the BIOS memory unit 100 using a memory address bus 200. As explained above, the processor may always attempt to access the same address, such as "0000 0000."

At least a part of the information on memory address bus 200 is input to the control circuit 400. Based on the signal from the memory address bus (Ax) and the control signal, the control circuit 400 generates a modified BIOS memory address signal 210 (A_Ax). The value Ax may be, for example, the first bit of a memory address. In this case, the control signal may indicate whether or not the first bit of the memory address should be inverted. For example, a single bit control signal may determine which of two paths through the control circuit 400 should be taken by Ax, generating A_Ax.

The value A_Ax may then be used to access the BIOS memory unit 100. For example, based on the control signal the control circuit 400 may selectively modify the address used to access the BIOS memory unit 100 from "0000 0000" to "1000 0000." In this way, which of the two BIOS programs that will execute on boot-up can be flexibly determined in a programmable way.

Figure 3:
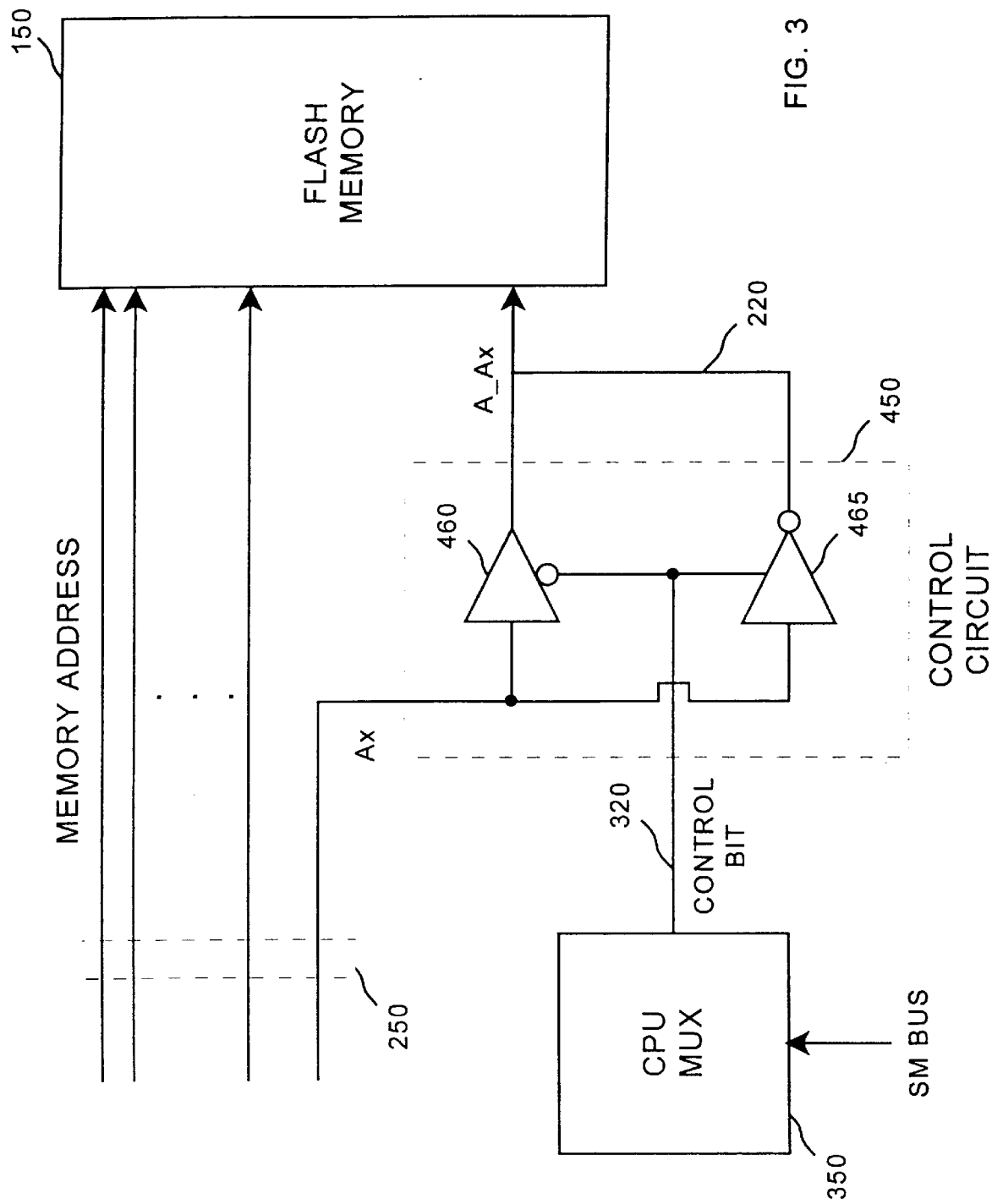
FIG. 3 shows a BIOS memory access control circuit in greater detail according to an embodiment of the present invention.

FIG. 3 shows a BIOS memory access control circuit 450 in greater detail according to an embodiment of the present invention. As before, a BIOS memory unit, such as a flash memory 150, may store a first BIOS program starting at a first address, such as "0000 0000," and a second BIOS program starting at a second address, such as "1000 0000."

According to an embodiment of the present invention, a programmable non-volatile storage unit, such as a Central Processing Unit (CPU) multiplex (MUX) integrated circuit 350, stores a non-volatile signal that can be programmed, for example, using a System Management (SM) bus. The non-volatile signal may be stored, for example, as a CPU MUX register bit. Based on the non-volatile signal, the CPU MUX 350 generates a control bit signal 320 that is sent to a control circuit 450.

Upon boot-up, a processor (not shown in FIG. 3) accesses the flash memory 150 using a memory address bus 250 comprised of a number of address lines. The processor may, for example, always attempt to access the same address, such as "0000 0000."

At least one of the address lines is input to the control circuit 450. According to an embodiment of the present invention, the control circuit 450 generates a modified BIOS memory address 220 (A_Ax), based on the value of the signal on this address line or lines (Ax) and the control bit signal, as follows. A first tri-state driver 460 and a second tri-state driver 465 receive Ax. The first tri-state driver 460 outputs a non-inverted Ax signal and is controlled by an inverted control bit signal. The second tri-state driver 465 outputs an inverted Ax signal and is controlled by an non-inverted control bit signal. One of the two tri-state drivers 460, 465 will always be on, and the other of the two tri-state drivers 460, 465 will float.

Thus, the two tri-state drivers 460, 465 selectively invert the value of single address line, based on the control bit signal, making A_Ax either "0" or "1." In this case, A_Ax, along with the remaining 7 address lines that were not input to the control circuit, may be used to access the flash memory unit 150. Thus, based on the control signal, either the address "0000 0000" or "1000 0000" will be accessed in the flash memory 150, and which of the two BIOS programs will execute on boot-up is flexibly determined.

Figure 4:
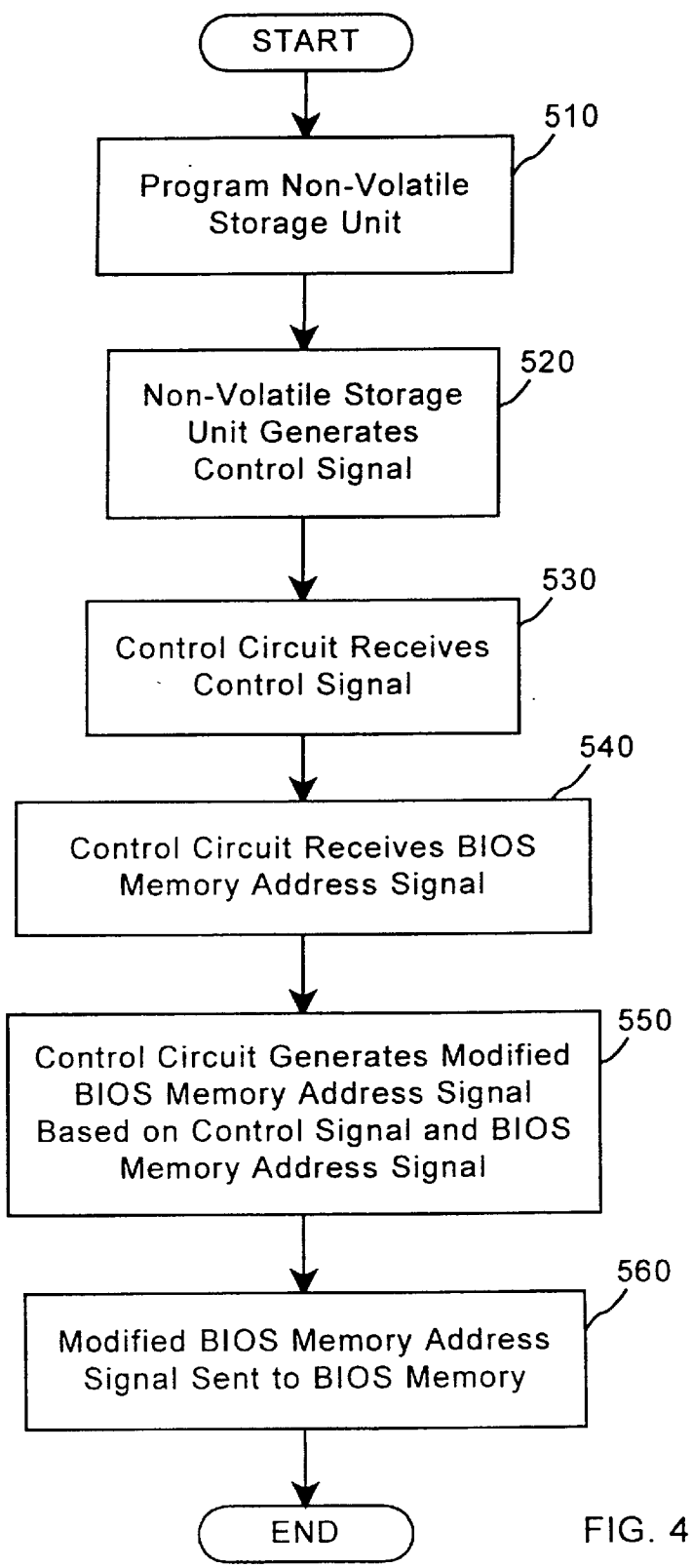
FIG. 4 is a block diagram of a method of controlling access to a BIOS memory according to an embodiment of the present invention.

FIG. 4 is a block diagram of a method of controlling access to a BIOS memory according to an embodiment of the present invention. The method may be used, for example, with a computer that has a BIOS memory with a first BIOS program, starting at a first memory address, and a second BIOS program, starting at a second memory address. Initially, a programmable non-volatile storage unit is programmed at 510 based on which of the two BIOS programs should be used when the computer boots-up. Depending on how the non-volatile storage unit has been programmed, the programmable non-volatile storage unit generates a control signal at 520.

A control circuit receives the control signal from the programmable non-volatile storage unit at 530. The control circuit also receives a BIOS memory address signal at 540. Based on the control signal and the BIOS memory address signal, the control circuit generates a modified BIOS memory address signal at 550, such as by modifying the BIOS memory address signal from the first memory address to the second memory address. This may be done, for example, by selectively inverting at least one of a plurality of BIOS memory address line signals.

The modified BIOS memory address signal is then sent to the BIOS memory at 560, resulting in either the first or second BIOS program being executed, depending on how the non-volatile storage unit was programmed Thus, an embodiment of the present invention defines a software/hardware architecture that allows a computer to boot-up using one of several different memory locations in BIOS memory, letting a software controlled, non-volatile signal determine the address used in subsequent accesses to BIOS memory. The signal may be set, for example, by a manufacturer using an external software program and related hardware to initialize the circuit board. Moreover, a single circuit board can flexibly support more than one BIOS architecture, or program.

The non-volatile bit may be set, for example, when the board is initially manufactured such that a default BIOS program will execute on boot-up. If another manufacturer wants a different BIOS program to execute, a software utility can put the new BIOS program in the BIOS memory device and write to a component that stores a non-volatile signal. Based on the non-volatile signal, a control circuit effectively re-maps the address used by the BIOS memory. Thus, the present invention offers a flexible way for a single product to support multiple BIOS memory addressing architectures, and reduces product development time by simplifying BIOS development for manufacturers.

Although various embodiments are specifically illustrated and described herein, it will be appreciated that modifications and variations of the present invention are covered by the above teachings and within the purview of the appended claims without departing from the spirit and intended scope of the invention. For example, although an eight-bit memory address was used to illustrate the present invention, it will be appreciated that memory addresses with different numbers of bits will also fall within the scope of the invention. Moreover, although two different BIOS programs were used to illustrate the present invention, a BIOS memory with more than two different BIOS programs will similarly fall within the scope of the invention.

What is claimed is:

1. An apparatus to control access to a Basic Input/Output System (BIOS) memory unit, comprising:
    a memory address bus having a plurality of BIOS memory address lines;
    a programmable non-volatile storage unit configured to generate a control bit signal;
    a control circuit, coupled to said programmable non-volatile storage unit, responsive to (1) the control signal and (2) a BIOS memory address signal, wherein said control circuit is configured to selectively invert the BIOS memory address signal based on the control bit signal to generate a modified BIOS memory address signal to said memory unit; and
    wherein said control circuit is coupled to said memory address bus and the BIOS memory address signal is transferred by at least one of said BIOS memory address lines.

2. The apparatus of claim 1, wherein the programmable non-voltile storage unit is a register.

3. The apparatus of claim 1, wherein the BIOS memory unit is configured to store a first BIOS program starting at a first memory address and a second BIOS program starting at a second memory address, and wherein said control circuit is configured such that one of the first memory address and the second memory address are generated based on the control signal.

4. The apparatus of claim 1, wherein said BIOS memory unit comprises a flash BIOS memory unit.

5. A method of controlling access to a Basic Input/Output System (BIOS) memory, comprising:
    receiving a control bit signal from a register;
    receiving a BIOS memory address signal;
    generating a modified BIOS memory address signal based on (1) the control bit signal received from a programmable non-volatile storage unit and (2) the BIOS memory address signal by selectively inverting the BIOS memory address, based on the control bit signal; and
    accessing said BIOS memory using said modified BIOS memory address signal.

6. The method of claim 5, further comprising:
    sending the modified BIOS memory address signal to a BIOS memory unit.

7. The method of claim 5, further comprising:
    executing one of a first BIOS program and a second BIOS program based on the modified BIOS memory address signal.

8. The method of claim 5, wherein the BIOS memory address signal is transferred by at least one of a plurality of BIOS memory address lines.

9. An apparatus to control access to a Basic Input/Output System (BIOS) memory, comprising:
    a memory address bus;
    a processor coupled to said memory address bus;
    a programmable non-volatile storage unit that generates a control bit signal;
    a control circuit, coupled to said programmable non-volatile storage unit and to said memory address bus, that receives (1) the control signal from said programmable non-volatile storage unit and (2) a BIOS memory address signal from said memory address bus, said control circuit generates a modified BIOS memory address signal by selectively inverting the BIOS memory address, based on the control bit signal; and
    a BIOS memory unit, coupled to said control circuit, that receives the modified BIOS memory address signal.

10. The apparatus of claim 9, wherein the BIOS memory unit is configured to store a first BIOS program starting at a first memory address and a second BIOS program starting a second memory address, and wherein said control circuit is configured such that one of the first memory address and the second memory address are generated based on the control bit signal.

* * * * *